United States Patent
Springer et al.

(10) Patent No.: US 8,397,522 B2
(45) Date of Patent: Mar. 19, 2013

(54) INTEGRATED DEHUMIDIFICATION SYSTEM

(75) Inventors: David A. Springer, Winters, CA (US);
Marc A. Hoeschele, Davis, CA (US);
James H. Phillips, Sacramento, CA (US)

(73) Assignee: Davis Energy Group, Inc., Davis, CA (US)

( * ) Notice: Subject to any disclaimer, the term of this patent is extended or adjusted under 35 U.S.C. 154(b) by 838 days.

(21) Appl. No.: 12/457,840

(22) Filed: Jun. 23, 2009

(65) Prior Publication Data

US 2009/0277193 A1    Nov. 12, 2009

Related U.S. Application Data

(63) Continuation-in-part of application No. 11/115,188, filed on Apr. 27, 2005, now abandoned.

(60) Provisional application No. 60/565,532, filed on Apr. 27, 2004.

(51) Int. Cl.
*F25D 17/06* (2006.01)
*F25B 49/00* (2006.01)
*F25B 1/00* (2006.01)

(52) U.S. Cl. .................. 62/93; 62/176.6; 62/228.3

(58) Field of Classification Search .............. 62/93, 498, 62/428, 176.5, 176.6, 228.3, 160, 173
See application file for complete search history.

(56) References Cited

U.S. PATENT DOCUMENTS

| | | | |
|---|---|---|---|
| 3,203,196 A * | 8/1965 | Malkoff | 62/173 |
| 3,402,564 A * | 9/1968 | Nussbaum | 62/173 |
| 3,572,052 A | 3/1971 | Toth | |
| 4,193,781 A | 3/1980 | Vogel et al. | |
| 4,744,223 A | 5/1988 | Umezu | |
| 4,803,848 A * | 2/1989 | LaBrecque | 62/183 |
| 4,920,756 A | 5/1990 | Howland et al. | |
| 4,938,032 A | 7/1990 | Mudford | |
| 4,984,433 A | 1/1991 | Worthington | |
| 5,062,276 A | 11/1991 | Dudley | |
| 5,231,845 A * | 8/1993 | Sumitani et al. | 62/160 |
| 5,473,906 A | 12/1995 | Hara et al. | |
| 5,651,258 A | 7/1997 | Harris | |
| 5,791,153 A | 8/1998 | Belding et al. | |
| 6,029,464 A | 2/2000 | Kil et al. | |
| 6,055,818 A | 5/2000 | Valle et al. | |
| 6,070,110 A | 5/2000 | Shah et al. | |
| 6,123,147 A | 9/2000 | Pittman | |
| 6,170,271 B1 | 1/2001 | Sullivan | |
| 6,427,454 B1 | 8/2002 | West | |
| 6,612,119 B2 * | 9/2003 | Eber et al. | 62/90 |
| 6,694,756 B1 | 2/2004 | Taras et al. | |

(Continued)

FOREIGN PATENT DOCUMENTS

JP    A 2003-207227    7/2008
KR    10-2002-0029886    4/2002

*Primary Examiner* — Chen Wen Jiang
(74) *Attorney, Agent, or Firm* — Oliff & Berridge, PLC (57) ABSTRACT

A dynamic system controls indoor relative humidity and temperature to achieve specified conditions by applying multiple stages of dehumidification. In addition to a stage that increases dehumidification by reducing the speed of the indoor blower, the system uses a reheat coil and multiple valves that allow the reheat coil to function as either a sub-cooling coil or a partial condenser. Thus the system can maintain specified indoor temperature and humidity conditions even at times when no heating or cooling is needed. The system may have an outdoor condensing unit including a compressor and a condenser operably connected via refrigerant lines to an indoor unit to form a "split system" refrigerant loop.

19 Claims, 6 Drawing Sheets

U.S. PATENT DOCUMENTS

| | | |
|---|---|---|
| 6,705,093 B1 | 3/2004 | Taras et al. |
| 6,826,921 B1 * | 12/2004 | Uselton .................. 62/176.6 |
| 2001/0054293 A1 | 12/2001 | Gustafson et al. |
| 2003/0061822 A1 | 4/2003 | Rafalovich |
| 2003/0192331 A1 | 10/2003 | Alford |
| 2006/0260334 A1 | 11/2006 | Carey et al. |

* cited by examiner

| SV# | OFF | OPERATING MODE | | | |
|---|---|---|---|---|---|
| | | STAGE 1 | STAGE 2 | STAGE 3 | STAGE 4 |
| 1 | CLOSED | OPEN | OPEN | OPEN | OPEN |
| 2 | CLOSED | CLOSED | CLOSED | OPEN | OPEN |
| 3 | CLOSED | OPEN | OPEN | CLOSED | OPEN |
| 4 | CLOSED | OPEN | OPEN | OPEN | CLOSED |

INTEGRATED DEHUMIDIFICATION SYSTEM

CROSS-REFERENCE TO RELATED APPLICATION

This application is a Continuation in Part of U.S. patent application Ser. No. 11/115,188, filed Apr. 27, 2005, which in turn claims the benefit of U.S. Provisional Application No. 60/565,532, filed on Apr. 27, 2004. The disclosures of these references are hereby incorporated by reference herein in their entirety.

BACKGROUND

The subject matter of this disclosure relates to providing building cooling, dehumidification, and fresh air ventilation through a range of outdoor and indoor conditions.

New U.S. homes that are built in compliance with ASHRAE Standard 90.2, Energy Star, and other energy efficiency programs have lower cooling loads than in the past, and because they are of tighter construction, they frequently require mechanical ventilation as prescribed by ASHRAE Standard 62.2. In humid climates, the ventilation air often requires more dehumidification than can typically be provided by air conditioners, because typical air conditioners in energy-efficient homes have short run times during many cooling load hours. Short run times typically limit latent cooling capacity, since less air passes over the cold evaporator coil. Failure to control excessive indoor humidity has contributed to problems with indoor mold. This issue has become increasingly expensive for homeowners and builders as mold-related property damage and class action lawsuits have risen steadily.

Vapor compression cooling systems (air conditioners) that are in use in most homes and other buildings provide a mix of sensible cooling (lowering the air temperature) and latent cooling (removing moisture). Typically, the sensible heat ratio ("SHR", the sensible cooling capacity divided by the total cooling capacity) for most residential cooling systems ranges from 0.7 to 0.8. In humid conditions, this SHR is often too high to maintain temperature and relative humidity in the ideal ranges of 74°-78° F., and 40-60%, respectively. Some vapor compression cooling systems lower the airflow rate through the evaporator coil to reduce the SHR under humid conditions, but re-evaporation of condensate retained on the coil at system shutdown still limits the SHR, particularly when systems cycle frequently, as they do under low load conditions. Such residential cooling systems are "split systems", with an outdoor condensing unit that includes the compressor, condensing coil, and condenser fan, and a separate indoor unit that includes an evaporator coil, expansion device, and system blower. Two refrigerant lines join the outdoor and indoor components.

Furthermore, a stand-alone dehumidifier is frequently used in humid climates to control indoor humidity. Because heat from the condenser is added to indoor air, the dehumidifier often increases the sensible cooling load, the air conditioner run time, and overall energy consumption. A preferred approach to dehumidification in the cooling season is to dehumidify indoor air by rejecting condenser heat to outside air instead of to the indoor space.

In the prior art, various strategies have been proposed to control both temperature and humidity. For example, U.S. Pat. No. 6,170,271 B1 shows a concept with two separate refrigerant loops: a first loop with the evaporator in the supply air stream and the condenser outdoors, for sensibly cooling the air stream; and a second "latent cooling" loop with the evaporator just downstream of the first evaporator, and with the condenser downstream of the second evaporator. This approach is similar to combining an air conditioner and a dehumidifier, but with the added benefits of requiring only one indoor blower and cabinet. A smaller second evaporator can be used because the air has been pre-cooled in the first evaporator. However, all heat from the second loop is added to the supply air, with associated energy penalties. In the embodiment, having the dehumidifier condenser located outside the supply air stream, the system is still penalized by the cost of requiring dual compressors, additional refrigerant piping, and condensers. Various other design configurations appear in the patent literature and are aimed at more precisely controlling both sensible and latent loads.

Another strategy having dual refrigerant loops is shown in U.S. Pat. No. 6,705,093 B1, which uses two condensing units that share an evaporator coil whose tubing pattern maintains separation of the two loops. One of the two loops has a sub-cooling coil. This approach adds substantial cost to a conventional system with a single refrigerant loop. Another approach to increasing latent cooling is shown in U.S. Pat. No. 6,427,454 B1. This design selectively causes a portion of the return air to bypass the evaporator coil, which lowers the coil temperature and increases moisture condensation on the coil. However, this approach is unlikely to succeed in the market, as it is comparable to lowering the blower speed, but with higher initial costs and without the energy savings associated with reducing blower speed.

U.S. Pat. No. 6,123,147 shows a retrofit system that adds a hot water reheat coil connected to a residential water heater located downstream of the evaporator. Like other "reheat" designs, this approach decreases the SHR by making the cooling system run longer. However, the economics of such a system will be poor because gas water heating is substituted for waste heat already available from the condensing side of the refrigerant system. Thus, this approach is like driving a vehicle using the accelerator and brake simultaneously. Other strategies, such as that disclosed in U.S. Pat. No. 5,791,153, apply desiccant-based enthalpy wheels to increase latent cooling. These designs require added components to recharge the desiccant and therefore may not be cost-effective.

Of the major product lines in the U.S. marketplace, only the Carrier® Infinity™ series and the Lennox™ SignatureStat™ controller claim features that control both temperature and humidity.

In the "packaged" air conditioning market with products usually applied to non-residential buildings, Lennox™ markets a patented Humiditrol® line that includes refrigerant control valves and a "hot gas" reheat coil for more precise humidity control. Carrier® markets the MoistureMiser™ that uses a "sub-cooling" coil for the same purpose. In both cases the strategy is to add some heat from the condenser side of the refrigerant system back into the supply air stream (downstream of the evaporator) to reduce the net cooling rate, as well as reducing supply air relative humidity. Such systems must run longer to satisfy the cooling load, and the longer run time removes more moisture at the evaporator. Adding more length to the coil on the condenser side also reduces the liquid refrigerant temperature into the evaporator, which increases evaporator capacity and therefore drops the evaporator temperature, increasing the rate of moisture removal. Lennox™ claims superior dehumidification performance because the higher heat output of the "hot gas" approach causes longer cooling cycles, thus removing more moisture compared to the sub-cooling approach.

These non-residential products use a "single-package" configuration, and no "split system" units currently include the "reheat coil" features described above. In fact, the Lennox™ hot gas approach is only workable in a single package device, as the system would require an extra pair of refrigerant lines to be applied in a "split system" configuration because refrigerant must flow first to the indoor reheat coil, then back to the condenser, then to the indoor expansion device. The Carrier® sub-cooling approach would not require an extra line set in a split system configuration because the refrigerant flows directly from the sub-cooling coil to the expansion device. However, the approach only provides two stages of dehumidification, and therefore cannot sufficiently control humidity when sensible loads are very low and latent loads are high.

SUMMARY

Although the vapor compression systems disclosed above, and others, use hot gas and sub-cooling reheat coils to reduce the SHR in single-package units, a system that dynamically combines features by applying multiple dehumidification stages in a split system configuration is desired. Such a system could maintain desired temperature and humidity conditions, even in the absence of cooling loads, through the full range of climatic conditions in the U.S. and elsewhere.

A desirable indoor comfort system for humid climates may use minimal added components to a conventional split air conditioning system, but may have the capability of dehumidifying even in a "neutral" condition wherein the building needs neither heating nor cooling. Using a single refrigerant loop with a supplemental reheat coil to achieve this condition may provide that the evaporator and the reheat coil have equal and opposite heat transfers to the air stream. The outdoor coil is then rejecting a heat quantity equal to the compressor input energy. A low indoor airflow rate is desirable to maximize latent cooling, taking care not to freeze the evaporator coil.

In various exemplary embodiments, the systems and methods according to this disclosure provide automatic, dynamic control of indoor relative humidity and temperature to achieve specified conditions by applying multiple stages of dehumidification. Various aspects of the exemplary embodiment include the capability to remove moisture from outside ventilation air supplied to maintain indoor air quality at times when no heating or cooling is needed. Exemplary embodiments have the ability to maintain a specified indoor relative humidity through a wide range of climates and seasonal conditions. For economic viability, such systems may be readily integrated with conventional heating and cooling components, applying the fan, coil, and condensing unit to both sensible cooling and dehumidification functions.

In various exemplary embodiments, the systems and methods according to this disclosure surpass the efficiency of air conditioners combined with stand-alone dehumidifiers by rejecting condenser heat developed in the dehumidification process to outdoors instead of indoors.

In various exemplary embodiments, the systems and methods according to this disclosure reduce energy use and startup time by regulating fan speed and properly managing refrigerant in the disclosed systems.

In various exemplary embodiments, the systems and methods according to this disclosure allow refrigerant to be evenly distributed into various circuits of the evaporator to improve efficiency.

In various exemplary embodiments, the systems and methods according to this disclosure efficiently and effectively dehumidify outside ventilation air supplied to buildings for the purpose of maintaining indoor air quality.

In various exemplary embodiments, the systems and methods according to this disclosure combine indoor cooling and dehumidification components into a single unit to facilitate installation and reduce cost.

In various exemplary embodiments, the systems and methods according to this disclosure reduce the re-evaporation of moisture into the supply air by controlling fan operation on startup and shutdown.

These and other objects and advantages of the disclosed systems and methods will be apparent in light of the following disclosure, claims and accompanying drawings.

BRIEF DESCRIPTION OF THE DRAWINGS

Various exemplary embodiments will be described, in detail, with reference to the following drawings in which like reference numerals refer to like elements and wherein.

DETAILED DESCRIPTION OF EMBODIMENTS

Exemplary embodiments of the systems and methods described in this disclosure comprise sets of vapor compression cooling components that can respond to a full range of sensible and latent cooling loads, and control components with appropriate logic for automatically maintaining indoor temperature and relative humidity within close tolerances. Exemplary embodiments of the disclosed systems and methods can condition (1) re-circulated indoor air, (2) outside ventilation air supplied to buildings to maintain indoor air quality, or (3) a mixture of the two. Exemplary components of such systems may include a two-speed compressor, a condensing coil, a condenser fan, a variable speed indoor blower, an evaporator coil, a reheat coil, a refrigerant receiver, thermostatic expansion valves, solenoid valves for switching refrigerant flow, check valves, "pressure-differential check valves" (PDCV's), temperature and humidity sensors, and controls for selecting operating modes for the system based on known or sensed conditions.

Figure 1:
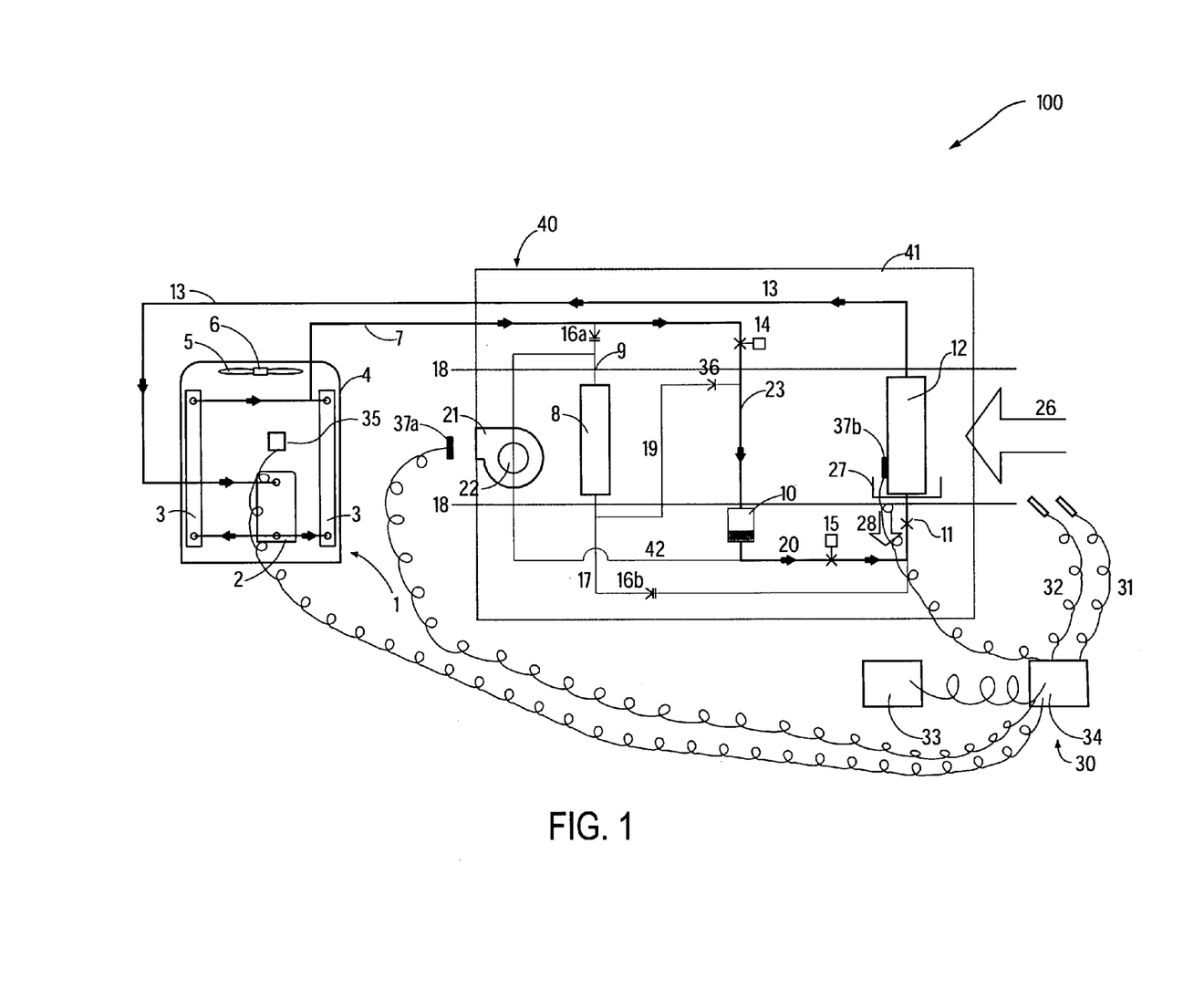
FIG. 1 illustrates a schematic diagram of a first exemplary embodiment of refrigeration and control components according to this disclosure showing alternate refrigeration flow paths associated with various dehumidification stages.

FIG. 1 shows a first exemplary embodiment of an integrated dehumidification system 100. The system comprises an outdoor condensing unit 1, an indoor unit 40, refrigerant lines 7 and 13 that connect the condensing unit 1 and the indoor unit 40, and a control system 30.

The condensing unit 1 includes a compressor 2, condensers 3, a cabinet 4, and a condenser fan 5 driven by a condenser fan motor 6. Major components of the indoor unit 40 include an evaporator coil 12, a reheat coil 8, a blower 21 driven by variable speed motor 22, automatic valves 14 and 15, and an enclosing cabinet 41. The indoor unit also includes PDCV's and refrigerant lines as will be discussed with respect to the specific dehumidification stages below. The control system 30 includes a thermostat 33 that includes sensors for indoor temperature 31 and humidity 32, temperature sensors for leaving air temperature 37a and evaporator coil temperature 37b, logic board 34, and condenser fan relay 35 in the outdoor condensing unit 1.

In this exemplary embodiment, the integrated dehumidification system 100 includes four dehumidification modes. A "Stage 1 dehumidification" mode has the lowest latent cooling capability and the highest SHR and may use a refrigerant flow schematic similar to that for a conventional split air conditioning system.

Stage 1 may be triggered by a call for sensible cooling by the thermostat. In stage 1, low pressure refrigerant vapor is compressed to a superheated, high pressure vapor state in the compressor 2 of the outdoor condensing unit 1. The vapor then passes through the condenser coils 3 where the vapor condenses to a liquid state, giving up heat, before leaving the outdoor condensing unit 1 through the refrigerant line 7. During this process, the condenser fan 5, driven by the fan motor 6, induces outdoor airflow across the condenser coils 3 to discharge heat to outdoor air. Although FIG. 1 shows two condenser coils 3 in parallel, other configurations, including, for example, a single "wrap-around" coil are contemplated.

After the liquid refrigerant enters the indoor unit 40 through the refrigerant line 7, the liquid refrigerant passes through an open automatic control valve 14. In this exemplary embodiment, there are multiple parallel paths through lines 9, 17, 19, and 42, toward the evaporator coil 12 through which the liquid refrigerant may flow. In each of these paths, however, there may be either a check valve 36 or PDCV's 16a, 16b. These various valves may have pressure drop settings higher than the downstream pressure drops between the entering refrigerant line 7 and an expansion device 11. In this embodiment, after passing through the automatic control valve 14, the refrigerant flow proceeds through the line segment 23 into the liquid receiver 10, then through another open automatic control valve 15 via the line segment 20, and on through the expansion device 11. The expansion device 11 restricts refrigerant flow and causes high pressure liquid to begin a change of state from liquid to a low pressure gas. From the expansion device 11, the refrigerant enters the evaporator coil 12 where the change of state is completed. As the refrigerant evaporates though the evaporator coil 12, the refrigerant absorbs heat from the air stream 26 driven through the air path 18 across the evaporator coil 12 by the indoor blower 21 powered by the blower motor 22. The heat absorbed by the refrigerant results in cooling of the air stream 26. If the surfaces of the evaporator coil 12 are cooler than the dew point temperature of the air stream 26, moisture will condense on the coil 12 and drip into a drain pan 27 from which it can be drained through condensate drain 28. From the evaporator 12, the low pressure refrigerant vapor returns through the refrigerant line 13 to the compressor 2 of the outdoor condensing unit 1.

If the indoor temperature continues to climb, or if Stage 1 capacity is insufficient to satisfy the cooling call after a specified period of time, the compressor 2 will be switched to a higher speed with the system fan maintaining, for example, 350-400 cfm per ton until the cooling call is satisfied (temperature setpoint is reached).

If the indoor relative humidity (RH) increases to within a set differential of a user's set point (e.g. 50% minus a 2% differential, or 48%), the integrated dehumidification system 100 will shift to "Stage 2 dehumidification." In Stage 2 dehumidification, the fan will modulate the airflow downward to increase latent cooling (moisture removal), and the speed of the fan is controlled proportional to the deviation of indoor RH from the RH setpoint. If the indoor RH exceeds the RH setpoint during this cycle, the fan will modulate to a lower airflow rate that will maintain the evaporator coil 12 between certain temperature limits, for example, a range of between 30 and 32° F., to facilitate increased moisture removal, while still providing sensible cooling. If indoor humidity later drops below the RH setpoint minus the differential, the control system 30 can return the operating speed of the blower motor 22 to the normal speed (350 to 400 cfm per ton).

Figure 2:
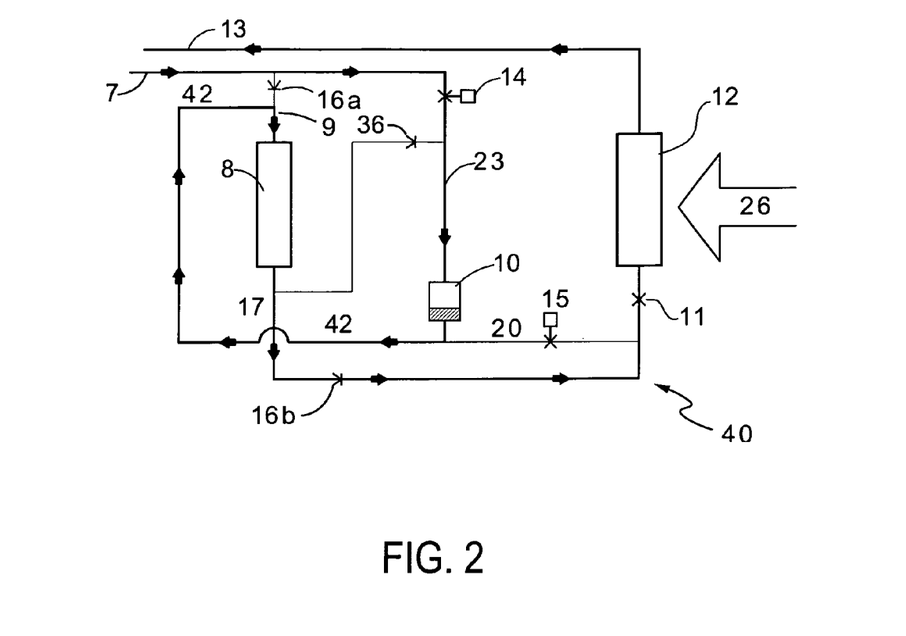
FIG. 2 illustrates a schematic diagram of the first exemplary embodiment of refrigeration and control components according to this disclosure showing first alternate refrigeration flow paths associated with various dehumidification stages.

FIG. 2 shows the refrigerant flow in the indoor condensing unit 40 when a "Stage 3 dehumidification" mode is in operation for the first exemplary embodiment. Stage 3 dehumidification enhances indoor air moisture removal while providing some sensible cooling. The condition of indoor air could be referred to as slightly humid, with the indoor temperature slightly below the cooling setpoint. Stage 3 is activated when the indoor RH is greater than the RH setpoint and the indoor temperature is within a set differential, for example within 2° F. of, the thermostat cooling temperature setting.

In Stage 3, warm refrigerant flowing from the condensing unit 1 adds heat to the supply air stream and sub-cools the refrigerant as it passes through the reheat coil 8, thus lowering the sensible heating capacity while removing moisture via the evaporator coil 12. The sub-cooled refrigerant improves the performance of the evaporator coil 12.

In Stage 3, automatic control valve 14 may remain open, and the refrigerant flow passes through the receiver 10, as in Stages 1 and 2. The refrigerant then flows through the line segment 42 toward the reheat coil 8, rather than through the line segment 20 toward the evaporator coil 12, because the automatic control valve 15 in the line segment 20 is now closed. A PDCV 16a which may require approximately 5 psi of pressure to overcome its spring force is located between the refrigerant line 7 and the intersection of the line segments 42 and 9 to prevent the refrigerant from flowing directly into the reheat coil 8 in the first three dehumidification stages. A check valve 36 in the line segment 19 prevents bypassing of the reheat coil 8 from the line segment 23 above the receiver 10 to the line segment 17 toward the expansion device 11. From the exit of the reheat coil 8, all refrigerant flows through the line segment 17 and through PDCV 16b to the expansion device 11 and the evaporator coil 12 before completing the circuit back to the compressor 2 of the outdoor condensing unit 1 through the refrigerant line 13.

In this circuit, the liquid refrigerant from the condenser 3 (see FIG. 1) is sub-cooled in the reheat coil 8. This process increases dehumidification mostly by adding heat back into the air stream 26 downstream of the evaporator coil 12, which reduces the cooling delivery rate, causing the cooling and dehumidification system 100 to run longer to satisfy the cooling load, and reduces the supply air relative humidity. Longer operation with a constant surface temperature pattern for the evaporator coil 12 results in more moisture removal as long as part of the surface of the evaporator coil 12 is colder than the dew point temperature of the entering air stream 26. This circuit offers an additional dehumidification benefit by subcooling the liquid refrigerant below the condensing temperature to lower the evaporating temperature, thus increasing the rate of moisture removal. The control system 30 (see FIG. 1) implements Stage 3 dehumidification by closing the automatic control valve 15.

In Stage 3, the compressor 2 will operate at low speed and the system fan control logic can incrementally adjust the airflow to maintain the evaporator coil temperature close to a freezing point of moisture, for example, between 30 and 32° F.

Figure 3:
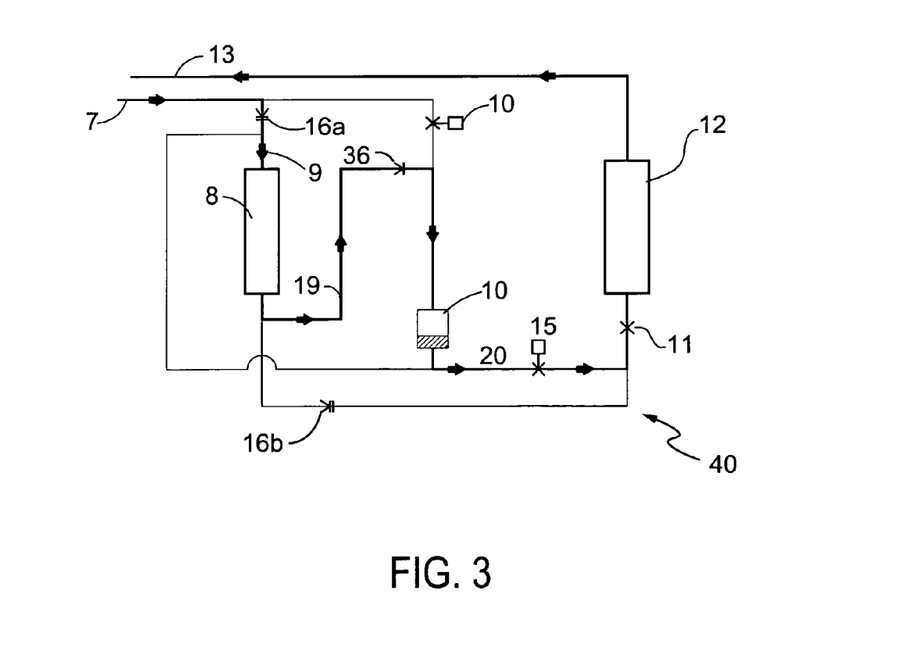
FIG. 3 illustrates a schematic diagram of the first exemplary embodiment of refrigeration and control components according to this disclosure showing second alternate refrigeration flow paths associated with various dehumidification stages.

A "Stage 4 dehumidification" mode operation is shown in FIG. 3 for the first embodiment. The purpose of this mode is to remove moisture from indoor air while providing little cooling or heating to the indoor air. The condition of indoor air could be referred to as slightly humid, with the indoor temperature considerably below a cooling setpoint. In this condition (cool and humid), it is undesirable to provide any sensible cooling since the indoor space will become too cool. The temperature of the air supplied to the space in this stage will be very close to the return air temperature.

Stage 4 will be activated if the indoor RH is greater than the RH setpoint and the indoor temperature is more than a set differential below the thermostat cooling temperature setting, for example more than 2° F. below the temperature setting. Supply airflow is regulated by varying the speed of the system fan in the same manner as in Stage 3, and the compressor will be operated at low speed.

In Stage 4, the automatic control valve 15 is opened and the automatic control valve 14 is closed so that the incoming refrigerant flow from the outdoor condensing unit 1 (see FIG. 1) is forced through the line segment 9 with a PDCV 16a into the reheat coil 8. The refrigerant flow then proceeds through a low pressure drop check valve 36 in line segment 19 before entering the receiver 10. The PDCV 16b may impose a greater pressure drop in line segment 17 than the sum of the pressure drops in the lines or segments 19, 20, the receiver 10, and the open valve 15. As a result, refrigerant flow is forced through the receiver 10. From the receiver 10, the refrigerant flow proceeds through the open automatic control valve 15 in the line segment 20 and through the expansion device 11 before entering the evaporator coil 12. With the receiver 10 downstream of the reheat coil 8, the refrigerant can partially condense in the reheat coil 8 because the refrigerant will preferentially condense in the coldest available location. Because the reheat coil 8 is in the low temperature air stream 26 leaving the evaporator coil 12, the reheat coil 8 will typically be cooler than the condensing coil 3 (see FIG. 1) located outdoors. As a result, the refrigerant partially condenses in the reheat coil 8, delivering more reheat than was available in Stage 3.

In Stage 4 the condenser fan is cycled on and off to maintain a supply air temperature that approximates the indoor air temperature and to prevent significant sensible cooling or heating of the supply air. Therefore, it is possible to operate in Stage 4 without either cooling or heating the supply air stream. This stage provides maximum latent cooling while minimizing sensible cooling of the air stream. In this "neutral" dehumidification case, sufficient condensing occurs in the reheat coil 8 to balance the cooling delivered at the evaporator coil 12, and the heat being discharged at the condensing unit 1 equals the equivalent heat input of the compressor 2 (see FIG. 1). In contrast, a conventional dehumidifier adds all heat, including the compressor input heat, to the space in which it is enclosed.

System operation may switch from Stage 3 to Stage 4 as needed to prevent overcooling the space. This switching from Stage 3 to Stage 4 may be based on indoor temperature relative to a thermostat cooling setpoint. When the indoor RH falls to the RH setpoint, the system may shut off.

On startup in any of the stages, a set amount of time may be allowed to elapse before the system fan is activated. This may aid in ensuring that the evaporator coil is cold when air begins to be supplied, and holds moisture on the coil so it is not immediately re-evaporated into the supply air stream, which would cause an increase in indoor relative humidity.

Figure 4:
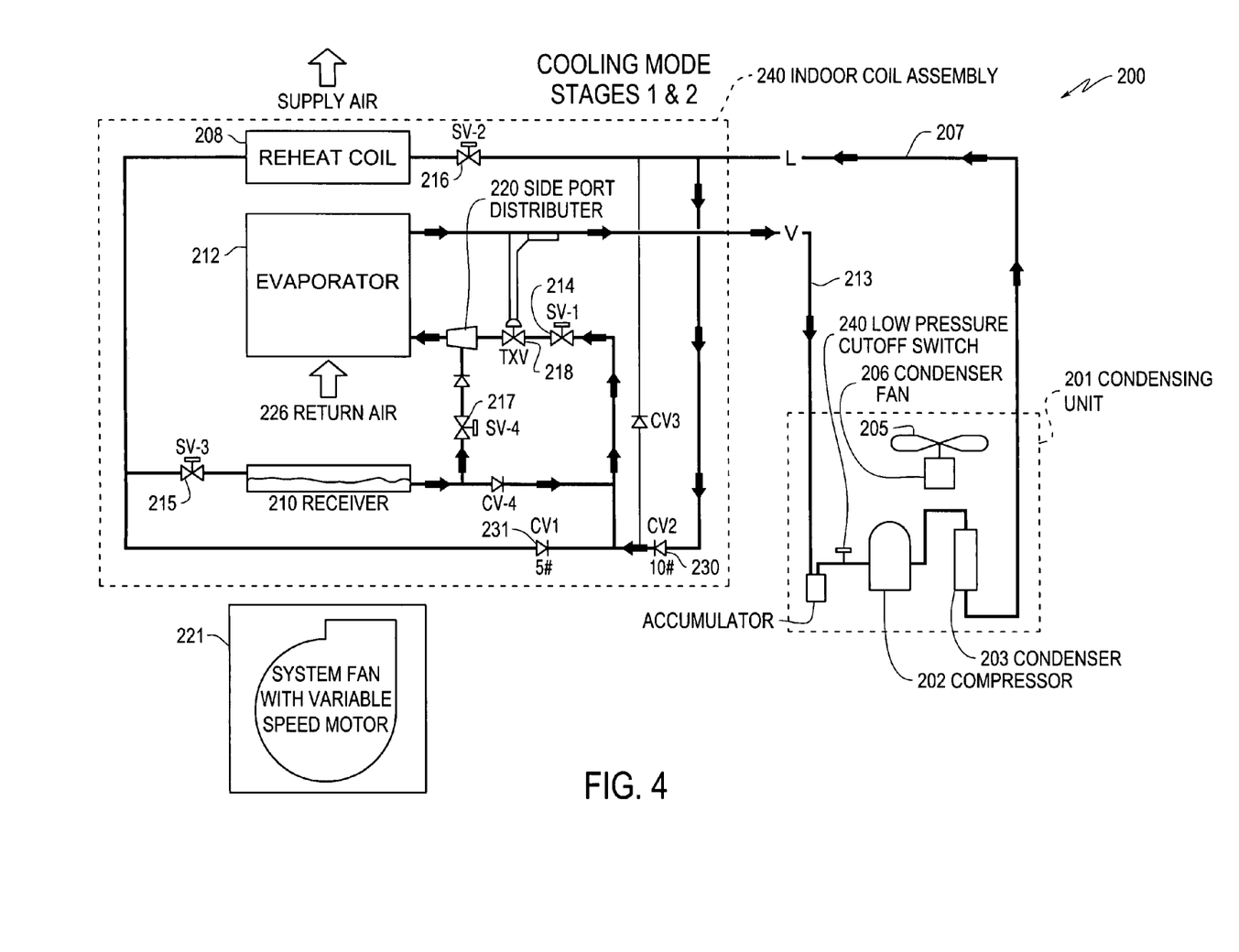
FIG. 4 illustrates a schematic diagram of a second exemplary embodiment of refrigeration and control components according to this disclosure showing an alternate arrangement of components associated with various dehumidification stages.
Figure 5:
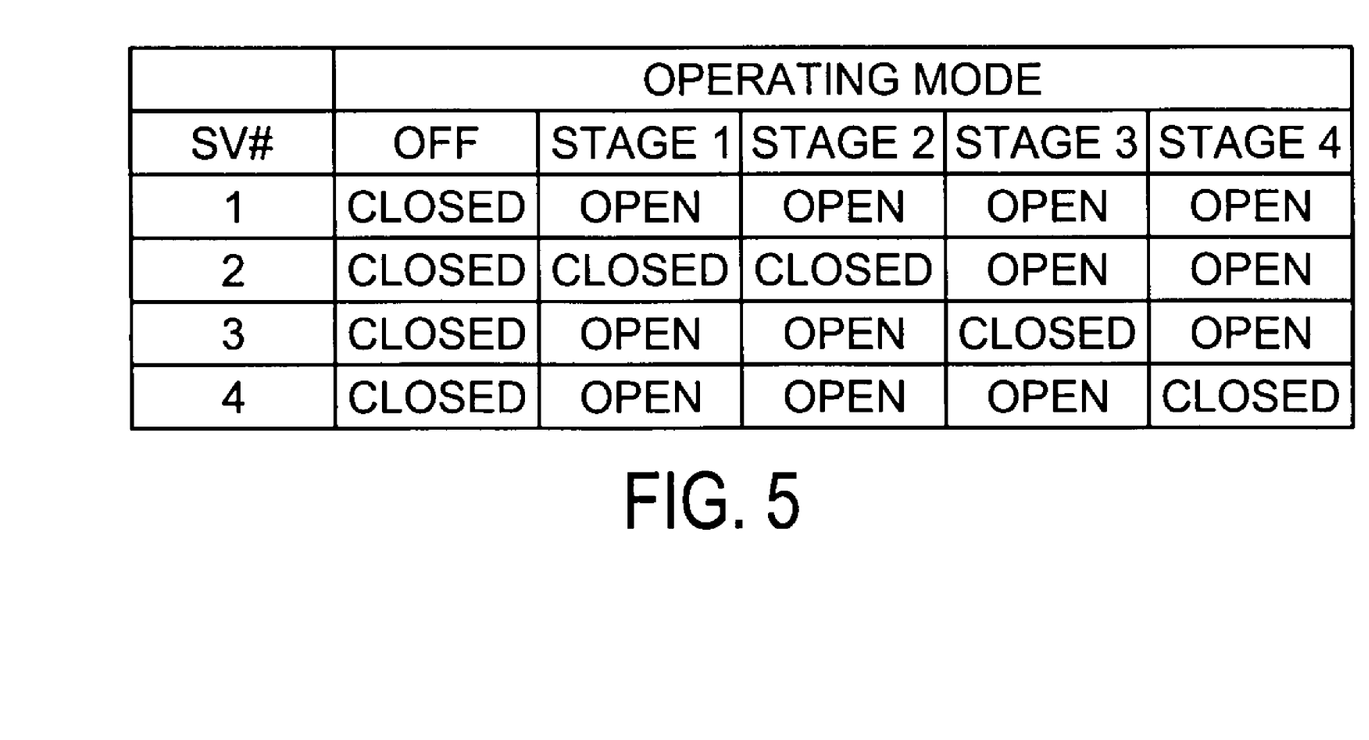
FIG. 5 illustrates a table of configurations of solenoid valves in various dehumidification stages (operating modes) of the refrigeration and control components shown in FIG. 4.

FIG. 4 shows a second exemplary embodiment 200 that may provide improved refrigerant control and reduced energy use. This second exemplary embodiment uses many components described above for the first exemplary embodiment. This embodiment also supports 4 stages of dehumidification. Combinations of open and closed solenoid valves, as shown in FIG. 5, may allow for selection of these stages. The 4 stages of the second embodiment perform similar functions to those of the first embodiment, and all of the additional controls and adaptions regarding, for example, fan speeds, compressor operation options and methods and controls for selection of a specific dehumidification stage, described for the first embodiment, may be applied to this second embodiment in any combination.

The second embodiment differs from the first embodiment in general in respect to the positioning and use of receiver 210 in the refrigerant circuits in order to improve refrigerant management and maintain proper subcooling in the various stages. In Stages 1 and 2 the refrigerant, rather than flowing through the receiver 210, passes through open valve 214 and side port distributor 220 to reach evaporator 212. The arrows in FIG. 4 indicate the flow of refrigerant in this embodiment for Stages 1 and 2.

Further, as can be seen, in this second embodiment the receiver 210 is not in the flow path of the refrigerant through the system, but the open valves 215 and 217 connect receiver 210 and reheat coil 208 to the low pressure side port of distributor 220, insuring that only low pressure vapor remains in receiver 210 and reheat coil 208, thereby retaining refrigerant in that part of the system to cause refrigerant back up and maintaining correct subcooling in condenser 203. Distributor 220 evenly distributes refrigerant from the receiver and reheat coil into the passages of evaporator 212.

Figure 6:
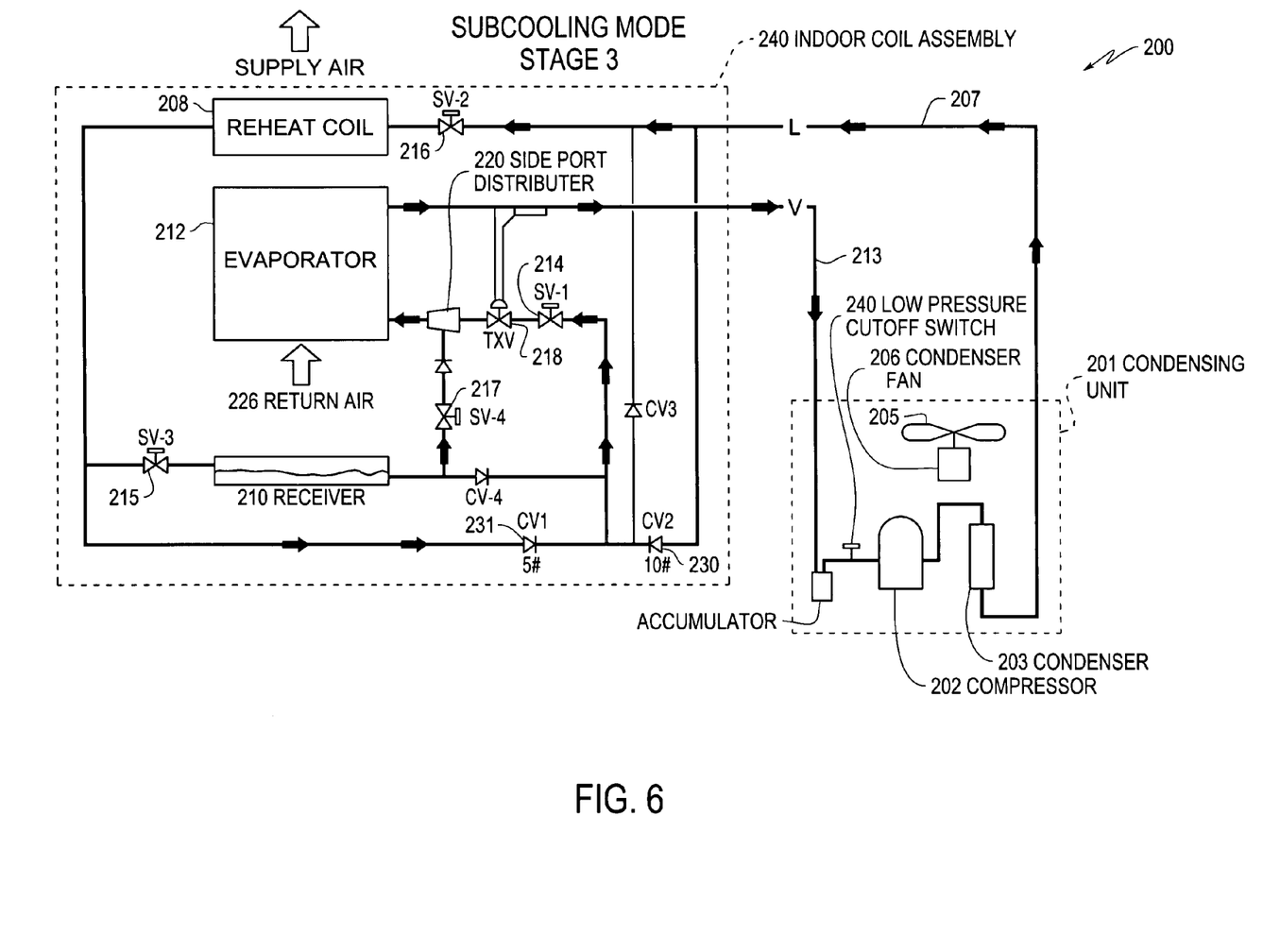
FIG. 6 illustrates a schematic diagram of the second exemplary embodiment of refrigeration and control components according to this disclosure showing alternate refrigeration flow paths associated with various dehumidification stages.

An exemplary flow scheme for the refrigerant in Stage 3 for the second embodiment is shown in FIG. 6. In Stage 3 of this embodiment, the open solenoid valve 216 causes refrigerant to flow from condenser coil 203 first through the reheat coil 208. PDCV 230 has a higher pressure drop setting than PDCV 231 so the refrigerant flows through PDCV 231, rather than PDCV 230. From PDCV 231, the refrigerant flows through solenoid valve 214 and the expansion valve 218 to the evaporator 212. The closed valve 215 prevents refrigerant flow to receiver 210. The warm liquid refrigerant flowing through reheat coil 208 adds heat to the supply air and is subcooled, increasing the capacity and moisture removal capability of evaporator coil 212, the combined effect of which is less sensible and more latent cooling.

Further, the solenoid valve settings in the second embodiment in Stage 3 allow liquid refrigerant to discharge into the evaporator through a side port distributor 220 to maintain correct subcooling (solenoid valves 214, 216, 217 open, solenoid valve 215 closed). The distributor 220 attempts to ensure the refrigerant is evenly distributed into the various circuits of the evaporator 212 to improve efficiency.

Figure 7:
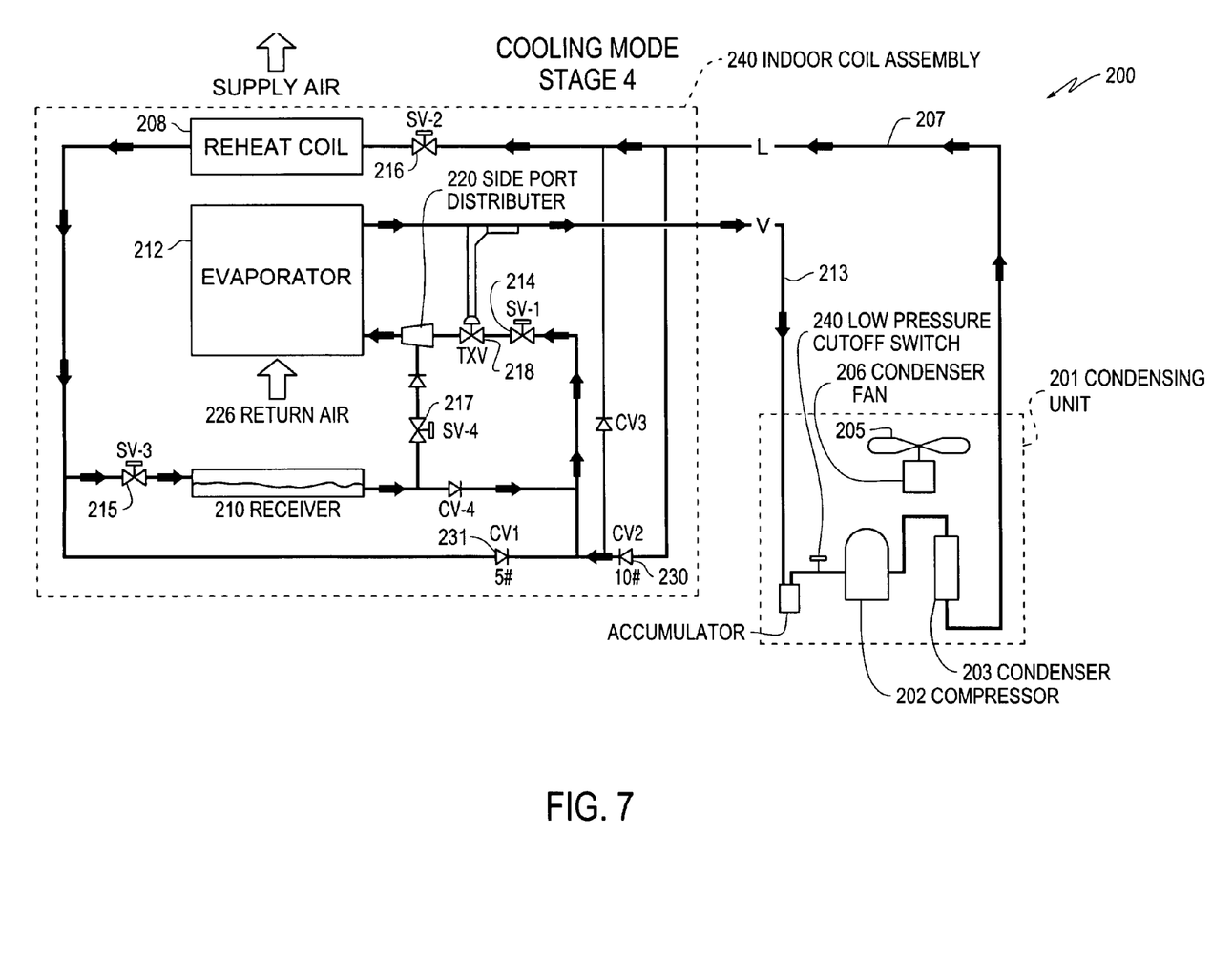
FIG. 7 illustrates a schematic diagram of the second exemplary embodiment of refrigeration and control components according to this disclosure showing alternate refrigeration flow paths associated with various dehumidification stages.

An exemplary flow scheme for the refrigerant in Stage 4 for this embodiment is shown in FIG. 7. As in Stage 3, the open solenoid valve 216 causes liquid refrigerant to flow through the reheat coil 208. However, solenoid valve 217 is closed, isolating receiver 210 from the low pressure port of distributor 220, and allowing high pressure liquid refrigerant that drains from reheat coil 208 to collect in receiver 210. This high pressure liquid is forced through open solenoid valve 214 and into TXV 218. Cold air from evaporator 212 keeps reheat coil 208 at a lower temperature than condenser 203, attracting refrigerant vapor to preferentially condense in reheat coil 208, adding further heat to the supply air stream. As in the first embodiment, condenser fan motor 206 is cycled in this embodiment to maintain a supply air temperature that is close to the indoor air temperature.

The second exemplary embodiment also includes features to reduce energy use and startup time. Although not specifically discussed above, these features may also be incorporated, at least in part, into the first embodiment. To reduce energy use and startup time, it is important to attempt to ensure that the refrigerant is properly controlled, allowing the system to quickly reach a state of equilibrium. For example, in the second embodiment when a cooling or humidity call is satisfied, all automatic valves (214 through 217) close and the compressor 202 continues to operate, pumping refrigerant out of the evaporator 212. When the refrigerant pressure in the evaporator 212 falls below a specified pressure setting of a low pressure cutoff switch 240 located in the condensing unit 201, the condensing unit 201 controls shut off the compressor 202. On startup, in any of the stages, solenoid valve 214 opens allowing refrigerant to flow through TXV 218 and into evaporator 212 where it changes state to a gas, raising the pressure at the compressor suction line, and closing the low pressure switch 240. This triggers the compressor 202 to operate.

With the multiple stage dehumidification strategies described here, it is possible to satisfy both temperature and humidity targets in indoor spaces through a full range of outdoor, indoor, and ventilation conditions. With control of the condensing unit fan, the system can even dehumidify in the absence of cooling loads or can deliver heat while dehumidifying, if desired. In each stage of the dehumidification operation, the system can operate at maximum potential efficiency by rejecting the most heat possible to the outdoor environment while satisfying the indoor temperature and humidity targets. For example, Stage 4 provides an SHR of approximately 0-10%; Stage 3 provides an SHR of approximately 40-60%; Stage 2 provides an SHR of approximately 60-70%; and Stage 1 provides an SHR of approximately 70-90%.

Although the systems and methods according to this disclosure have been shown and described with respect to preferred embodiments, it should be understood that various changes and omissions in the form and detail of components, processes, and structural inter-relationships may be made without departing from the spirit and scope of the disclosure. For example, the system has been described assuming an air-cooled condenser. However, the multi-stage dehumidification strategies described may be applied with water-cooled condensers or storage-type condensers such as hydronic or direct refrigerant ground-loops.

What is claimed is:

1. A system for controlling environmental conditions in a space, comprising:

a vapor-compression refrigerant loop including at least a 2-speed compressor, a condenser, a reheat coil, an expansion device, a receiver and an evaporator coil;

a variable speed air mover that drives a first air stream sequentially from a space across the evaporator and a reheat coil;

a plurality of valves disposed within the vapor-compression refrigerant loop; and a controller operably connected to the vapor-compression refrigerant loop, the air mover and the plurality of valves, wherein the condenser discharges heat to an environment outside the space, and the controller controls a plurality of discrete stages with differing rates of sensible cooling and latent cooling, the controller selects from among the plurality of stages based on at least one of sensed environmental conditions relative to user input temperature and humidity settings, the controller being configured to select a first stage of the plurality of discrete stages that provides maximum latent cooling of the first air stream while minimizing sensible cooling and sensible heating of the first air stream, and in the first stage, the controller controls the operation of the valves to cause refrigerant to (i) flow through the reheat coil, (ii) then drain from the reheat coil to the receiver, and (iii) then flow from the receiver to the expansion device, the controller being further configured to select a second stage that provides enhanced latent cooling with moderate sensible cooling of the first air stream, and in the second stage the controller controls the operation of the valves to cause the refrigerant to (i) flow through the reheat coil; and (ii) then bypass the receiver and flow to the expansion device, the sensible cooling corresponds to reducing a measured temperature of the first air stream, the sensible heating corresponds to increasing a measured temperature of the first air stream, and the latent cooling corresponds to reducing a humidity of the first air stream.

2. The system of claim 1, wherein the controller selects the first stage by opening a first valve of the plurality of valves at an input to the reheat coil, and opening a second valve of the plurality of valves at an input to the receiver.

3. The system of claim 1, wherein the controller selects the second stage by opening a first valve of the plurality of valves at an input to the reheat coil, and closing a second valve of the plurality of valves at an input to the receiver.

4. The system of claim 1, wherein the controller is configured to select a third stage that controls a ratio of sensible cooling to latent cooling of the first air stream by controlling a speed of the first air stream to change a temperature of the evaporator coil.

5. The system of claim 4, wherein the controller selects the third stage by closing a first valve of the plurality of valves at an input to the reheat coil causing refrigerant flow to bypass the reheat coil and the receiver, and changing a speed of the first air stream.

6. The system of claim 1, wherein the controller is configured to select a fourth stage that maximizes sensible cooling of the first air stream.

7. The system of claim 6, wherein the controller selects the fourth stage by closing a first valve at an input to the reheat coil causing refrigerant flow to bypass the reheat coil and the receiver.

8. The system of claim 1, wherein the condenser is cooled by a second air stream driven by at least one condenser fan and a flow rate of the second air stream is controlled by controlling the at least one condenser fan.

9. The system of claim 8, wherein the at least one condenser fan operates at substantially a single speed when on, and is cycled on and off to alter a heat exchange rate of the second air stream and to regulate the temperature of the first air stream.

10. The system of claim 1, wherein the controller is operably connected to a temperature sensor and a humidity sensor inside the space, and the controller controls at least one of (1) the air mover, (2) the condenser, and (3) one of the plurality of valves based on input from the temperature sensor and the humidity sensor.

11. The system of claim 10, wherein the first stage is selected when the humidity sensor senses a humidity in the space to be greater than a first preset humidity value and the temperature sensor senses a temperature in the space to be less than a first preset temperature value, and
the second stage is selected when the temperature of the air in the space is between a first preset temperature value and a second preset temperature value.

12. The system according to claim 1,
wherein when a stage is halted, the compressor continues to pump refrigerant from the evaporator until the refrigerant pressure in an inlet of the compressor falls below a first preset value, and
when a stage is started, refrigerant is allowed to flow into the evaporator, and the compressor begins to pump refrigerant when the refrigerant pressure in the inlet of the compressor rises above a second preset value.

13. The system of claim 1, wherein, during the second stage, the controller controls the operation of the valves to cause the refrigerant to pass through the receiver prior to flowing through the reheat coil.

14. The system of claim 1, wherein the 2-speed compressor has a high speed and a low speed, and the controller is configured to control the compressor to operate in the low speed during the first stage.

15. A method for controlling environmental conditions in a space, comprising:
providing a vapor-compression refrigerant loop including at least a compressor, a condenser, a reheat coil, an expansion device, a receiver and an evaporator coil;
providing a variable flow air mover that drives an air stream from a space sequentially across the evaporator and a reheat coil;
providing a plurality of valves disposed within the vapor-compression refrigerant loop; and
controlling, with a controller, the vapor-compression refrigerant loop, the air mover and the plurality of valves to select from among a plurality of discrete stages with differing rates of sensible cooling and latent cooling based on at least one of sensed environmental conditions relative to predetermined environmental conditions and user input,
controlling with the controller, selection of a first stage from among the plurality of stages that provides maximum latent cooling of the air stream while minimizing the sensible cooling and sensible heating of the air stream, the controller selecting the first stage when the humidity of air in the space is greater than a preset humidity value and the temperature of the air in the space is less than a preset temperature value, and the controller controlling the valves in the first stage to cause refrigerant to (i) flow through the reheat coil, (ii) then drain from the reheat coil to the receiver, and (iii) then flow from the receiver to the expansion device, and
controlling, with the controller, selection of a second stage from among the plurality of stages that provides enhanced latent cooling with moderate sensible cooling of the air stream, the controller selecting the second stage when the temperature of the air in the space is between a first preset temperature value and a second preset temperature value, and the controller controlling the valves in the first stage to cause the refrigerant to (i) flow through the reheat coil; and (ii) then bypass the receiver and flow to the expansion device,
wherein the sensible cooling corresponds to reducing a measured temperature of the air stream, and
the latent cooling corresponds to reducing a humidity of the air stream.

16. The method of claim 15, the controller selecting the first stage by opening a first valve of the plurality of valves at an input to the reheat coil, and opening a second valve of the plurality of valves at an input to the receiver.

17. The method of claim 15, further comprising controlling, with the controller, selection of a third stage from among the plurality of stages when the humidity of the air in the space is less than a first preset humidity value and greater than a second preset humidity value, by closing a first valve at an input to the reheat coil, causing refrigerant flow to bypass the reheat coil and the receiver, the controller controlling a ratio of sensible cooling to latent cooling of the air stream by controlling a speed of the air stream to change a temperature of the evaporator coil.

18. The method of claim 15, further comprising controlling, with the controller, selection of a fourth stage from among the plurality of stages when the humidity of air in the space is less than a preset humidity value and the temperature of the air in the space is greater than a preset temperature value, by closing a first valve at an input to the reheat coil, causing refrigerant flow to bypass the reheat coil and the receiver, the fourth stage maximizing sensible cooling of the air stream.

19. The method of claim 15, wherein the controller switches from the second stage to the first stage when the temperature of the air in the space drops below the temperature range defined by the first preset temperature value and the second preset temperature value.

* * * * *